United States Patent [19]
Watson

[11] Patent Number: 5,226,770
[45] Date of Patent: Jul. 13, 1993

[54] PIPE HANGER NUT ASSEMBLY

[76] Inventor: Richard J. Watson, 8930 Oak Street, Vancouver, B.C., Canada, V6P 4B7

[21] Appl. No.: 803,511

[22] Filed: Dec. 9, 1991

[51] Int. Cl.[5] ............................................. F16B 23/00
[52] U.S. Cl. .................................... 411/397; 411/82; 411/401; 248/58
[58] Field of Search ............... 411/397, 401, 403, 400, 411/366, 82, 427; 248/58, 59, 62, 231.9, 231.91

[56] References Cited

U.S. PATENT DOCUMENTS

| | | | |
|---|---|---|---|
| 941,714 | 11/1909 | Jenckes | 248/58 X |
| 1,072,361 | 9/1913 | Rickman | 248/58 X |
| 2,485,280 | 10/1949 | Grace | 411/366 X |
| 3,044,584 | 7/1962 | Thompson | 411/403 X |
| 3,099,108 | 7/1963 | Kalkbrenner | 411/446 X |
| 3,329,057 | 7/1967 | Salz | 411/366 |
| 4,211,048 | 7/1980 | Naka | 411/82 X |
| 4,440,534 | 4/1984 | LaBate | 411/82 |
| 4,652,193 | 3/1987 | Hibbs | 411/82 |
| 4,770,584 | 9/1988 | Vinciguerra | 411/366 |
| 4,822,223 | 4/1989 | Williams | 411/82 |

FOREIGN PATENT DOCUMENTS

| | | | |
|---|---|---|---|
| 27698 | of 1897 | United Kingdom | 411/439 |
| 1091700 | 11/1967 | United Kingdom | 411/456 |
| 1162701 | 8/1969 | United Kingdom | 411/403 |

*Primary Examiner*—Peter M. Cuomo
*Assistant Examiner*—Jerry Redman
*Attorney, Agent, or Firm*—James D. Givnan, Jr.

[57] ABSTRACT

A hanger nut assembly for attachment to a concrete wall form so as to embed a hanger nut of the assembly in a wall being constructed. A headless screw attaches the nut in abutment with the wall form and is readily removable to facilitate form stripping. A pipe hanger rod is subsequently engageable with the wall installed nut after wall completion.

1 Claim, 1 Drawing Sheet

PIPE HANGER NUT ASSEMBLY

BACKGROUND OF THE INVENTION

The present application is a substitute application for U.S. patent application 07/551,016 abandoned prior to the filing of this application.

The present invention concerns the installation of a pipe supporting bracket in a concrete wall during wall construction.

A problem exists in the installation of pipe hangers in concrete walls and ceiling as such installation in a previously cast wall is prohibitive from a labor standpoint.

Existing methods and means for installation of a pipe hanger nut in a cast wall or ceiling under construction are also objectionable from a labor cost standpoint. Further, existing hanger nut installation practices to not utilize concrete forms for mounting of a hanger nut to be embedded in a wall being formed. Still further, a problem exists in cast in place pipe hangers being displaced on a supporting form to permit the entry of foreign matter into a threaded bore of the hanger. U.S. Pat. No. 941,714 is of interest in that it discloses a form attached pipe hanger.

SUMMARY OF THE PRESENT INVENTION

The present invention is embodied in a hanger nut attachable by a connector to a wall form member for embedment of the nut into the wall being cast.

The hanger nut is part of an assembly which includes a connector for temporary threaded engagement with a wall form member. The connector, in one form, includes a threaded shaft having one end for engagement with the hanger nut and the remaining end for threaded engagement with the form member. The connector serves to hold one end of the hanger nut flush against the inner side of the wall forms yet, upon removal, permits unimpeded stripping of the wall form. The threaded connector occupies, at least partially, the hanger nut during casting of a wall or ceiling to prevent entry of concrete into an end of the hanger nut. The connector includes at least one hexagonal socket to avoid having an enlarged fastener head which would impede stripping of the form.

Important objectives include the provision of a hanger nut assembly particularly suited for use with concrete forms of plywood construction to permit rapid and accurate installation of a hanger nut in a wall being cast; as well as rapid stripping of the wall form; the provision of a hanger nut assembly which lends itself to rapid installation on a wall form with a threaded connector of the assembly providing secure attachment to and repeated use on a form used for identical walls of a multi-story building; the provision of a hanger nut not susceptible to dislodgement by vibratory equipment.

DETAILED DESCRIPTION OF THE PREFERRED EMBODIMENTS

Figure 1:
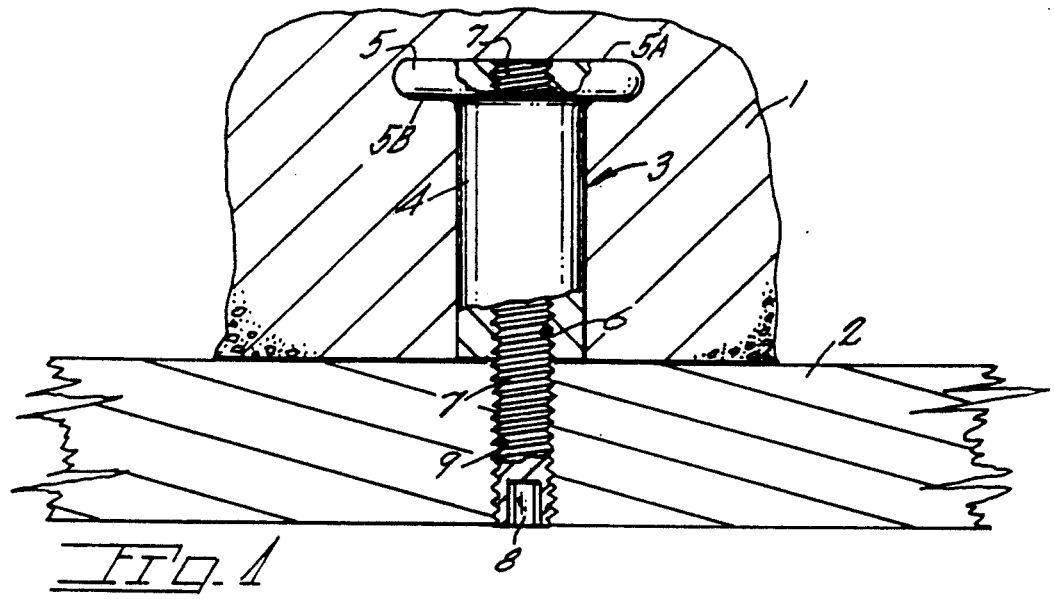
FIG. 1 is a fragmentary, side elevational view of the present hanger nut and connector on a wall form.

With continuing attention to the drawings wherein applied reference numerals indicate parts similarly hereinafter identified, the reference numeral 1 indicates a fragment of a ceiling formed of concrete poured in place on a form 2. Typically wall forms may be of plywood construction.

A hanger nut generally at 3 includes a barrel portion 4 which terminates at one end in a head 5. Head 5 has upper and lower surfaces 5A and 5B which, along with cylindrical barrel portion 4, are in surface contact with the poured concrete.

An internally threaded bore 6 extends axially of the hanger nut barrel to receive an externally threaded connector shaft 7. Tool receiving means shown as a socket 8 in the upper and lower ends of the connector shaft permits driving tool engagement with the connector and may be of hexagonal cross section to receive a hexagonal driving tool. Connector 7 is a threaded shaft preferably of a length equal to the thickness of concrete form 2 plus the length of hanger nut bore 6 so as to fully occupy the latter to prevent the entry of concrete into the bore. If desired, bore 6 may be closed or be a blind bore at its end adjacent head 5 or closed by the application of a tape patch to surface 5A.

In use, the hanger assembly is attached to a wall form by threaded shaft or connector 7 being driven downwardly into engagement with the opening 9 form. The opening 9 may be used repeatedly to receive a connector 7 for the installation of hanger nuts in successive ceilings or walls of a multi-story building. Such securement of a hanger nut to a form precludes subsequent displacement as could occur if the hanger nut were in a friction fit with a form used repeatedly. Subsequent use of the form without a connector in place in opening 9 is possible as the bore is of a small enough size to allow the concrete to bridge across the bore.

Figure 2:
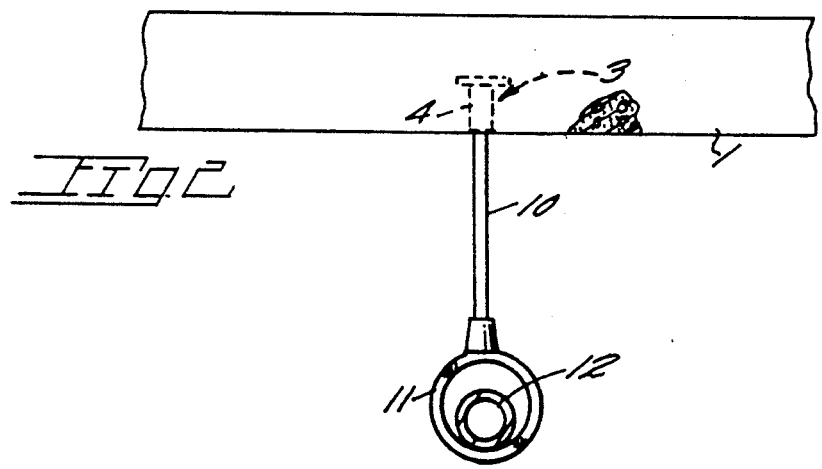
FIG. 2 is an elevational view of the hanger nut in place in a ceiling with a pipe hanger rod therein supporting a pipe.
Figure 3:
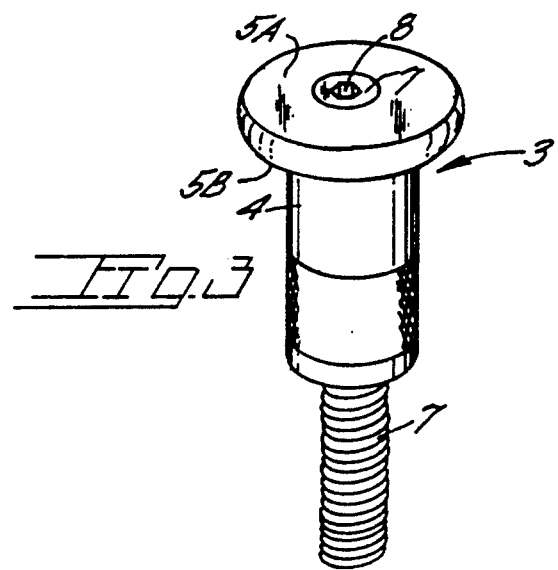
FIG. 3 is a perspective view of a hanger nut of the present invention.

In FIG. 2 an installed hanger nut is shown with a hanger rod 10 depending therefrom and equipped with a ring 11 for supporting a pipe 12.

Connector 7 is preferably provided with a drive socket 8 at both of its ends. Accordingly the connector can be driven into place and later removed from opposite sides of the form. The term wall form includes any form for the forming of a vertical or horizontal component of a concrete building structure.

While I have shown but a few embodiments of the invention, it will be apparent to those skilled in the art that the invention may be embodied still otherwise without departing form the spirit and scope of the invention.

Having thus described the invention, what is desired to be secured by a Letters Patent is:

I claim:

1. A piper hanger nut assembly for threaded attachment to a wall form prior to the casting of a wall for a concrete structure, said pipe hanger nut assembly comprising, a hanger nut including a head portion and a barrel portion and having an axially extending threaded bore extending through said head portion and said barrel portion, an elongate externally threaded shaft provided with screw threads along its length and of uniform diameter having a first end segment for threaded engagement with the threaded bore of the hanger nut, a second end segment of the threaded shaft for threaded engagement with the wall form, said threaded shaft having first and second tool receiving means located at said first and second end segments, and said first and second tool receiving means for the reception of a drive tool to enable installation of the threaded shaft from one side of the wall form and subsequent removal of the threaded shaft from the hanger nut from the other side of the wall form to permit stripping of the form and to leave the threaded bore of the hanger nut free of foreign matter.

* * * * *